(12) United States Patent
Brinkmann et al.

(10) Patent No.: US 9,908,399 B2
(45) Date of Patent: Mar. 6, 2018

(54) DEVICE FOR INFLUENCING AN AIR FLOW IN AN ENGINE COMPARTMENT OF A MOTOR VEHICLE

(71) Applicant: FORD GLOBAL TECHNOLOGIES, LLC, Dearborn, MI (US)

(72) Inventors: Bernd Brinkmann, Dormagen NRW (DE); Johann Hendrik Wegers, Cologne NRW (DE); Thomas Nitsche, Neuss NRW (DE); Julian Tietze, Cologne NRW (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/440,666

(22) Filed: Feb. 23, 2017

(65) Prior Publication Data

US 2017/0246950 A1 Aug. 31, 2017

(30) Foreign Application Priority Data

Feb. 29, 2016 (DE) ........................ 10 2016 203 219

(51) Int. Cl.
*B60K 11/08* (2006.01)
*F01P 7/10* (2006.01)

(52) U.S. Cl.
CPC .............. *B60K 11/085* (2013.01); *F01P 7/10* (2013.01)

(58) Field of Classification Search
CPC .................................. B60K 11/085; F01P 7/12
See application file for complete search history.

(56) References Cited

U.S. PATENT DOCUMENTS

| | | | |
|---|---|---|---|
| 5,205,484 A | 4/1993 | Susa et al. | |
| 8,091,516 B2 | 1/2012 | Preiss | |
| 8,136,487 B2 | 3/2012 | Bernt et al. | |
| 2007/0199751 A1* | 8/2007 | Bradley | B60K 11/085 180/68.1 |
| 2009/0266312 A1 | 10/2009 | Preiss | |
| 2010/0243352 A1* | 9/2010 | Watanabe | B60K 11/085 180/68.1 |
| 2014/0005896 A1 | 1/2014 | Hirota et al. | |
| 2016/0298580 A1 | 10/2016 | Lee et al. | |

FOREIGN PATENT DOCUMENTS

| | | |
|---|---|---|
| CN | 203063662 U | 7/2013 |
| DE | 10137175 A1 | 2/2003 |
| DE | 102005024444 A1 | 12/2005 |
| DE | 102004034313 A1 | 2/2006 |
| FR | 2890607 A1 | 3/2007 |
| JP | H03220023 A | 9/1991 |
| KR | 20130026875 A | 3/2013 |

OTHER PUBLICATIONS

German Patent Office, Office Action for the corresponding German Patent Application No. 10 2016 203 219.4, dated Jan. 4, 2017.

* cited by examiner

*Primary Examiner* — Bryan A Evans
(74) *Attorney, Agent, or Firm* — James Dottavio; Brooks Kushman P.C.

(57) ABSTRACT

The present disclosure relates to a device for influencing an air flow within an engine compartment of a motor vehicle. The device comprises an adjusting means for adjusting the device between two end positions. The device is allocated to a part region of the engine compartment so that in one of the end positions, an air flow that is provided in the engine compartment is in part or entirely either guided into the part region or guided away from the part region.

17 Claims, 1 Drawing Sheet

DEVICE FOR INFLUENCING AN AIR FLOW IN AN ENGINE COMPARTMENT OF A MOTOR VEHICLE

CROSS-REFERENCE TO RELATED APPLICATIONS

This application claims foreign priority benefits under 35 U.S.C. § 119(a)-(d) to DE 10 2016 203 219.4 filed Feb. 29, 2016, which is hereby incorporated by reference in its entirety.

TECHNICAL FIELD

The present disclosure relates to a device for influencing an air flow within an engine compartment of a motor vehicle, said device comprising an adjusting means for adjusting the device between two end positions.

BACKGROUND

Such devices are known and are used for the purpose of ensuring the engine compartment is ventilated or cooled by introducing an air flow that is present outside the vehicle into the engine compartment of the motor vehicle. It is thereby rendered possible to ventilate and/or cool the engine compartment on demand. Air may be introduced into the engine compartment by adjusting such a device if the air is required for ventilating and/or cooling the engine compartment. Otherwise, if ventilation and/or cooling of the engine compartment is not required, air is not introduced into the engine compartment. This may be accomplished by covering or restricting an air transfer aperture, that is the entrance point for air to flow into the engine compartment.

It is possible to use such devices to maintain improved outer aerodynamics of the vehicle and/or to maintain a noise encapsulation of the engine by closing coverings over air transfer apertures if ventilation and/or cooling of the engine compartment is not required.

DE 101 37 175 A1 discloses an engine covering of a motor vehicle having an air transfer aperture that has an adjustment means for adjusting the position of a closing element with respect to the air transfer aperture so as to close and/or open the air transfer aperture. The air transfer aperture can be opened by means of adjusting the closing element and cool air can be introduced into the engine compartment.

US 2009/0266312 A1 discloses a device including a cooler and a cooling shutter having lamellae and a by-pass. The cooling shutter can be opened and the by-pass can be closed by means of adjusting the angle of the lamellae, and cooling air can thus be introduced into the engine compartment.

It is may be necessary to ventilate and/or to cool various components in various positions in the engine compartment, such as a generator, transmission, battery or other components, at a specific time and/or in specific operating or environmental conditions when it is not necessary to ventilate and/or to cool other components at other positions of the engine compartment. Therefore, more air may be provided to the engine compartment than is required for the dedicated ventilation or cooling of individual components. As a consequence, the outer aerodynamics and/or noise encapsulation of the vehicle may be affected in a disadvantageous manner.

SUMMARY

It is the object of the present disclosure to render possible an improved distribution of air in the engine compartment so that it is no longer necessary to provide more air than is required for localized ventilation and/or cooling.

The device is allocated to a part region of the engine compartment so that when the device is in one of the end positions, an air flow that is provided in the engine compartment is either in part or entirely guided into the part region or guided away from the part region.

The term "engine compartment" is not only to be understood as the region around an internal combustion engine and/or any other component that delivers power to the powertrain of the vehicle (e.g., electrical drive motor), but rather the term "engine compartment" also includes the installation space around further components and parts that are allocated to operate the engine or are operated by the engine (e.g., generator, transmission, battery, vehicle steering arrangement, cooling circuit of a vehicle climate control system, etc.). In general, the engine compartment is typically located at the front end of the vehicle and less commonly in the rear or in the center of the vehicle. The engine compartment is enclosed on the front and rear by fenders and/or bulkheads of the vehicle, on the sides by bodywork side parts, on top by an engine compartment hood, and on the bottom by an engine compartment cover. Other configurations are however also feasible.

The term a "part region of the engine compartment" is to be understood as a region, a volume, or an installation space having three-dimensions that extends within the engine compartment of the vehicle but does not extend over the entire engine compartment but rather is limited by at least one further part region. It is in other words a localized region within the engine compartment.

In the part region it is possible, independently of other part regions of the engine compartment, for an air flow to be required so as to ventilate and/or cool the part region. For this purpose, it is possible to use an air current that is already provided in the engine compartment, and it is then necessary to at least in part direct said air flow to the part region that is to be ventilated and/or cooled. For this purpose, it is expedient that when the device is adjusted to one of the end positions, that the air flow that is provided in the engine compartment is in part or entirely either guided into the part region if ventilation and/or cooling of the part region is required, or is guided away from the part region if ventilation and/or cooling of the part region is not required.

The adjustability of the device that is provided by an adjustment mechanism can be represented in different ways. It is feasible that the device can be adjusted by an adjustment mechanism that includes switching between the two end positions (but may also be capable of switching to intermediate positions between the two end positions) or can also be adjusted in a fully variable manner so as to better control the adjustment.

It is preferred if the part region of the engine compartment is arranged within the delimiting parts of an engine compartment encapsulation and/or engine compartment enclosure. It is then possible in a simpler and more efficient manner by means of at least one aperture that is provided in the engine compartment encapsulation and/or engine compartment enclosure, to provide a defined air flow in the engine compartment for diversion by means of the device.

It is furthermore preferred if the part region of the engine compartment is arranged downstream behind a cooling module. It is also possible in this case to achieve an air flow that is directed into the engine compartment and provided in the engine compartment in that the air, which is guided through the cooling module that comprises one or multiple coolers through which air can flow, enters the engine compartment downstream of the one or multiple coolers.

In an advantageous embodiment, the part region of the engine compartment includes at least one component that is to be ventilated and/or cooled. The component could be, for example, a generator, transmission, battery or another electrical component, pump, drive motor, guiding part of a vehicle steering arrangement, compressor or a cooling circuit of a vehicle climate control system, etc. Additional vehicle components, not listed herein, having another function could be arranged in the part region of the engine compartment.

It is particularly advantageous if the device is part of the component that is to be ventilated and/or cooled or is arranged on or fastened to said component. As a consequence, on the one hand, the air flow for ventilating and/or cooling the component in the part region of the engine compartment in which the component is arranged can be influenced in a particularly efficient manner. In particular, it is possible in the vicinity of the component and on the surfaces of the component to thus achieve an efficient ventilation and/or cooling effect when required to take into account the temperature distribution on the component. On the other hand, it is possible to also achieve advantages with regards to the component costs and complexity by means of embodying the device as part of the component.

A preferred embodiment provides that the adjustment mechanism of the device includes an element whose shape and/or expansion can be changed by means of a change in temperature so that as a consequence, the device is adjusted in the case of a change in temperature. It is thus possible to achieve the temperature-dependent adjustment of the device in a particularly simple manner.

In a particularly preferred embodiment, the element includes a bimetallic or a material that has a shape memory. The adjustment mechanism could include a bimetallic element that deforms in the case of a change in temperature by means of the different expansions of the two metals that are included in the bimetallic element, causing the adjustment of the device. In a similar manner, the element can include a material that has a shape memory that, depending upon temperature, deforms by means of a change in its crystalline structure and causes the adjustment of the device.

It is also preferred that the adjustment mechanism include an electrical and/or hydraulic and/or pneumatic actuator. As a consequence, the adjustment mechanism of the device can be attached to a control device with the aid of which it is then possible to adjust the device when required.

The motor vehicle may include a device for influencing an air flow.

The method for influencing an air flow in an engine compartment of a motor vehicle when using the device includes the steps:

(1) Sensing a temperature that is allocated to a part region of the engine compartment; and (2) Adjusting the device if the temperature is higher or lower than a threshold temperature.

The step of sensing a temperature that is allocated to a part region of the engine compartment means that a temperature that prevails in a part region or in/on a component arranged in the part region is ascertained. The temperature can be ascertained either by means of a temperature-dependent deformation of an element whose form and/or expansion can be changed by means of a change in temperature, or by means of measuring temperature with the aid of an electronic temperature sensor.

In the step of adjusting the device, if the temperature is higher or lower than a threshold temperature, a check is performed as to whether ventilation and/or cooling is required in the part region of the engine compartment or on the component. If the temperature that is allocated to the part region of the engine compartment or the component is higher than a threshold temperature, then ventilation and/or cooling is required. If the temperature that is allocated to the part region of the engine compartment or the component is lower than a threshold temperature, then ventilation and/or cooling is not required.

If ventilation and/or cooling is required, then the device is adjusted in such a manner that an air flow that is provided in the engine compartment is in part or entirely guided into the part region. If ventilation and/or cooling is not required, then the device is adjusted in such a manner that an air flow that is provided in the engine compartment is in part or entirely guided away from the part region.

An embodiment of the device is illustrated in FIG. 1 and FIG. 2.

DETAILED DESCRIPTION

As required, detailed embodiments of the present disclosure are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present device and method disclosed herein.

Figure 1:
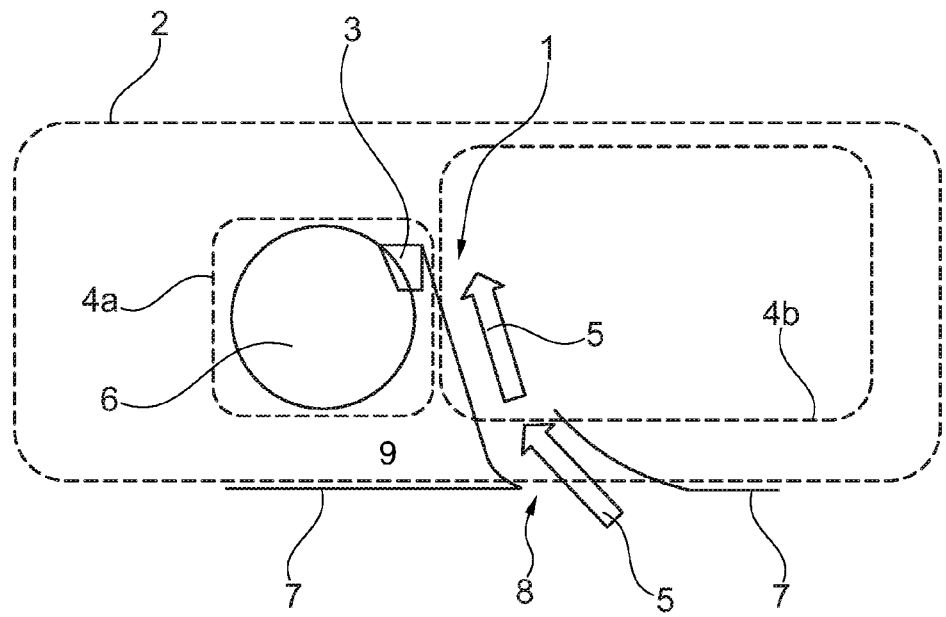
FIG. 1 illustrates the vehicle and the device after being adjusted to a first end position.

FIG. 1 illustrates the vehicle 10 and the device 1 after being adjusted to a first end position. In FIG. 1, ventilation and/or cooling is not required in a part region 4a of the engine compartment 2, said part region adjoining a second part region 4b of the engine compartment 2 and being arranged within the engine compartment 2 and/or within an engine compartment enclosure that includes the engine compartment cover 7. In FIG. 1, it is not necessary to ventilate and/or cool the component 6. The device 1 is accordingly adjusted by means of the adjustment mechanism 3 into the first end position. The air flow 5 enters into the engine compartment 2 through the aperture 8 of the engine compartment cover 7 and is guided away from the part region 4a. More, specifically, the device 1 may include a shutter 9 that is moveable via the adjustment mechanism 3 and the air may be guided away from the part region 4a when the shutter 9 has been adjusted to a first position via the adjustment mechanism 3.

Figure 2:
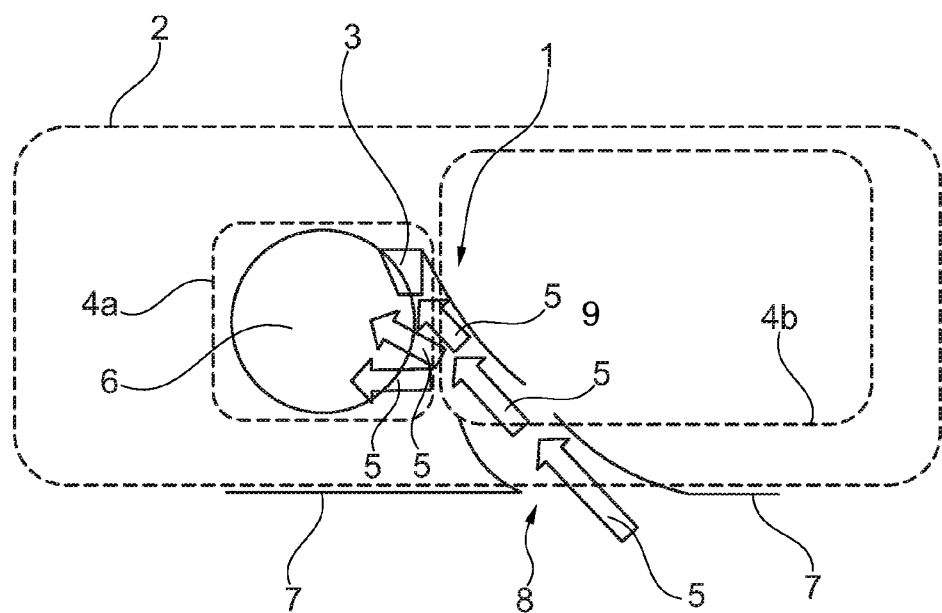
FIG. 2 illustrates the vehicle and the device after being adjusted to a second end position.

FIG. 2 illustrates the vehicle 10 and the device 1 after being adjusted to a second end position. In FIG. 2, ventilation and/or cooling is required in the part region 4a of the engine compartment 2. The device 1 is accordingly adjusted by means of the adjustment mechanism 3 into a second end position. The air flow 5 enters the engine compartment 2 through the aperture 8 of the engine compartment cover 7 and is guided into the part region 4a. The air then flows over the component 6 such that the component 6 is ventilated and/or cooled. More, specifically, the air may be guided into the part region 4a when the shutter 9 has been adjusted to a second position via the adjustment mechanism 3.

While exemplary embodiments are described above, it is not intended that these embodiments describe all the possible embodiments. Rather, the words used in the specification are words of description rather than limitation, and it is understood that various changes may be made without departing from the spirit and scope of the present disclosure. Additionally, the features of various implementing embodiments may be combined to form additional embodiments.

What is claimed is:

1. A vehicle comprising:
   an enclosure defining an engine compartment having first and second portions and an orifice that accesses the engine compartment;
   a shutter having a single vane configured to,
      direct airflow through the orifice into the first portion and shield the second portion when in a first position, and
      direct airflow through the orifice into the second portion and shield the first portion when in a second position.

2. The vehicle of claim 1 further comprising an adjustment mechanism configured to adjust the vane between the first and second positions.

3. The vehicle of claim 1, wherein the first portion is downstream of a cooling module.

4. The vehicle of claim 2, wherein the first portion houses a vehicle component that is to be ventilated via the airflow.

5. The vehicle of claim 4, where the adjustment mechanism and shutter are secured to the vehicle component.

6. The vehicle of claim 5, wherein the adjustment mechanism includes an element that changes form in response to a change in temperature such that the position of the vane adjusts between the first and second positions in response to a change in temperature of the element.

7. The vehicle of claim 6, wherein the element is a bimetallic element that deforms in response to a change in temperature resulting in different expansions of two metals that comprise the bimetallic element.

8. The vehicle of claim 6, wherein the element is comprised of a material having shape memory that deforms in response to a change in temperature resulting in a change in crystalline structure of the element.

9. The vehicle of claim 2, wherein the adjustment mechanism includes an electrical actuator.

10. The vehicle of claim 2, wherein the adjustment mechanism includes a hydraulic actuator.

11. The vehicle of claim 2, wherein the adjustment mechanism includes a pneumatic actuator.

12. A method of adjusting airflow in a vehicle engine compartment having first and second portions comprising:
   sensing a temperature of the first portion; and
   adjusting a single vane to a first position such that the vane directs airflow into the first portion and shields the second portion in response to the temperature being greater than a threshold.

13. The method of claim 12, further comprising adjusting the vane to a second position such that the vane directs airflow into the second portion and shields the first portion in response to the temperature being less than the threshold.

14. The method of claim 13, wherein the first portion houses a vehicle component and the method further comprises sensing a temperature of the vehicle component and adjusting the vane to the first position to direct airflow into the first portion in response to the temperature of the vehicle component being greater than the threshold.

15. The method of claim 14, further comprising adjusting the vane to the second position to direct airflow away from the first portion in response to the temperature of the vehicle component being less than the threshold.

16. A method of adjusting airflow in a vehicle engine compartment having first and second portions comprising:
   sensing a temperature of a vehicle component that is housed in the first portion; and
   adjusting a single vane to a first position such that the vane directs airflow into the first portion and shields the second portion in response to the temperature being greater than a threshold.

17. The method of claim 16, further comprising adjusting the vane to a second position such that the vane directs airflow into the second portion and shields the first portion in response to the temperature being less than the threshold.

* * * * *